W. P. M. BRAUN.
POWER LAWN MOWER.
APPLICATION FILED JULY 7, 1908.
941,127.
Patented Nov. 23, 1909.
2 SHEETS—SHEET 2.
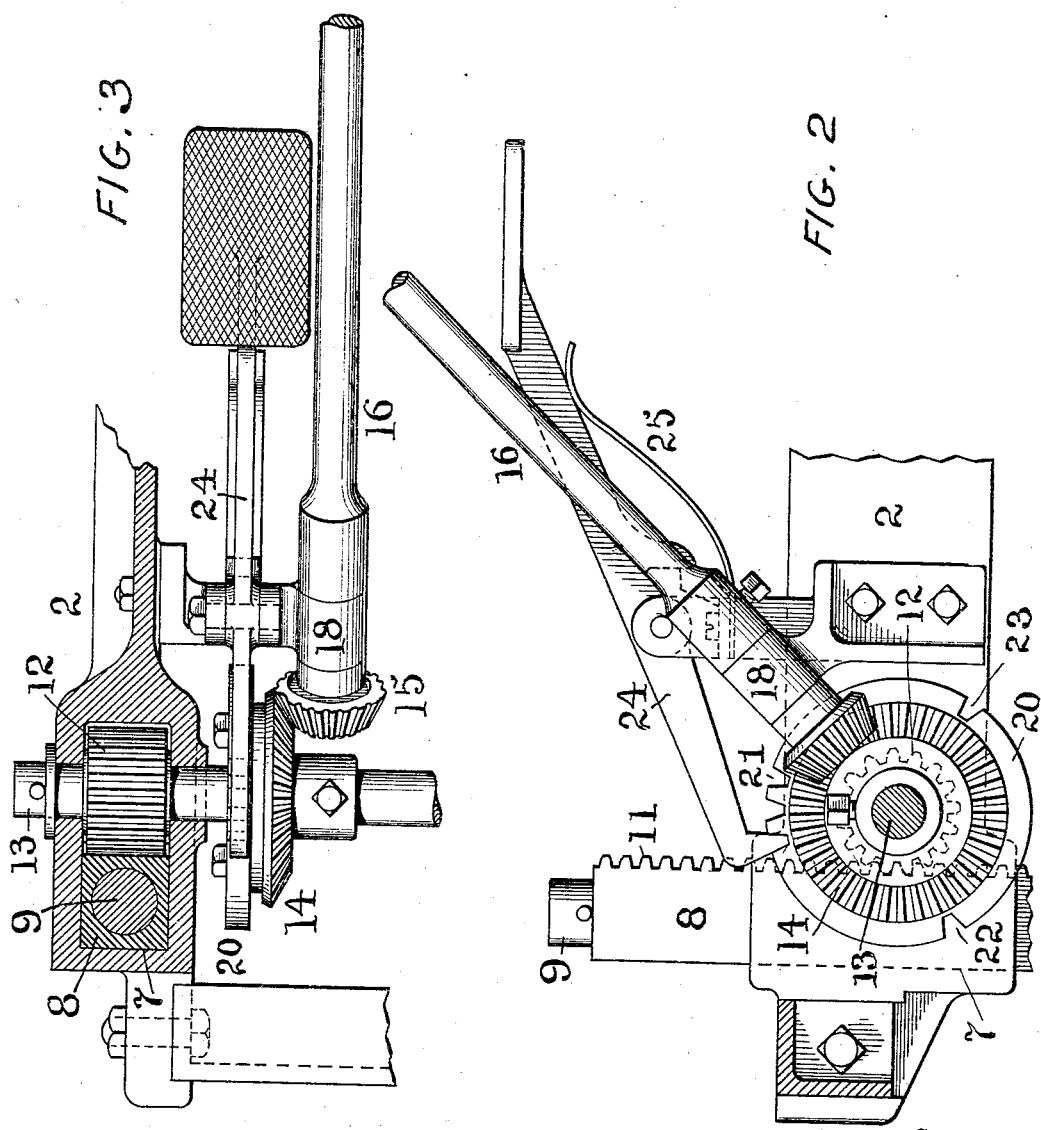

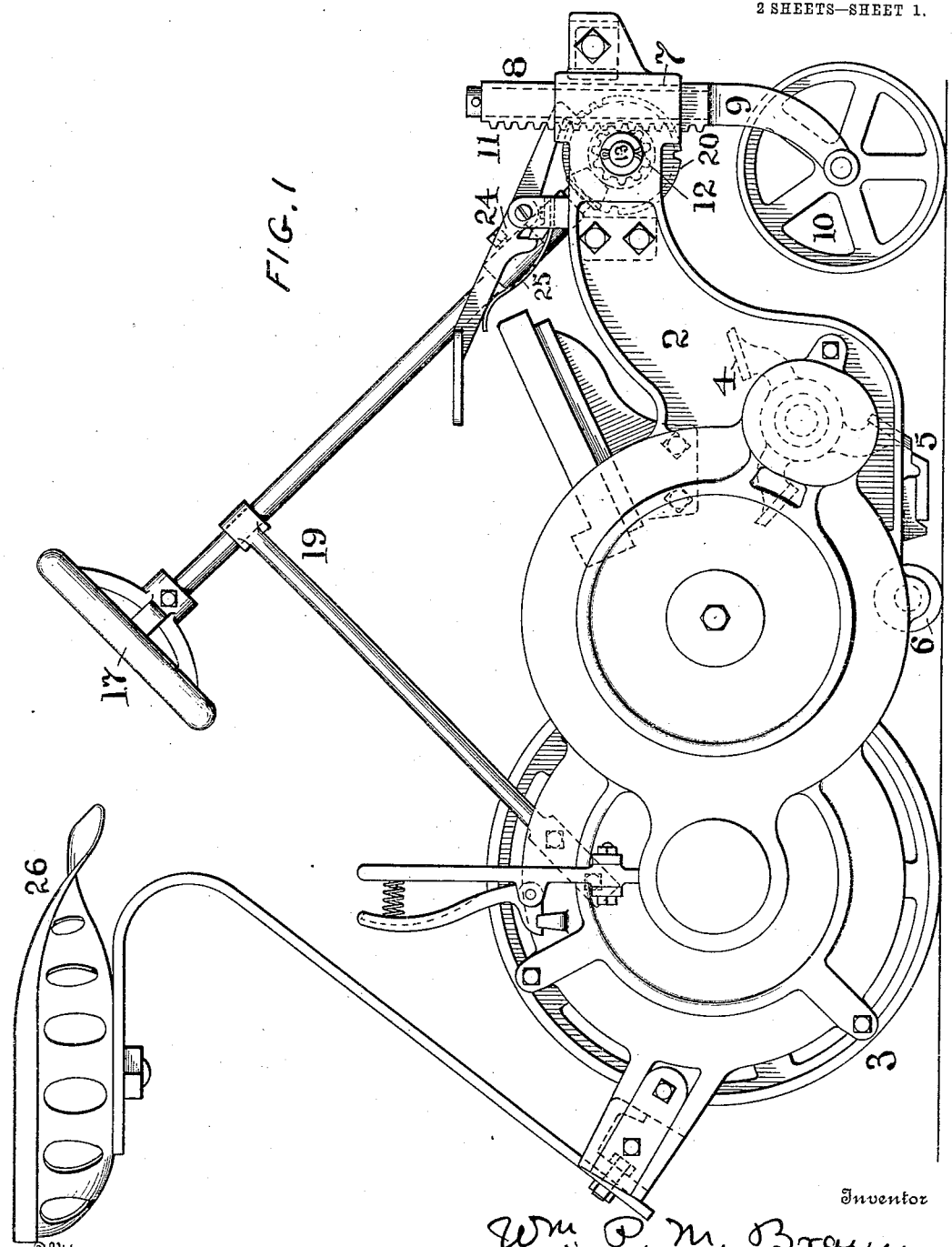

UNITED STATES PATENT OFFICE.

WILLIAM P. M. BRAUN, OF PHILADELPHIA, PENNSYLVANIA, ASSIGNOR TO JOHN F. BRAUN AND WILLIAM P. M. BRAUN, COPARTNERS, TRADING AS JOHN BRAUN & SONS, OF PHILADELPHIA, PENNSYLVANIA.

POWER LAWN-MOWER.

941,127.    Specification of Letters Patent.    Patented Nov. 23, 1909.

Application filed July 7, 1908. Serial No. 442,385.

*To all whom it may concern:*

Be it known that I, WILLIAM P. M. BRAUN, a citizen of the United States, and resident of the city and county of Philadelphia, State of Pennsylvania, have invented an Improvement in Power Lawn-Mowers, of which the following is a specification.

My invention has reference to power lawn mowers, and consists of certain improvements which are fully set forth in the following specification and shown in the accompanying drawings which form a part thereof.

The object of my invention is to provide a power operated lawn mower with means within reach of the operator for elevating or adjusting the position of the cutter bar above the ground for the purpose of varying the length of the cut grass to suit the desire of the operator, for passing over occasional obstructions which might injure the cutters, or for elevating the cutters to such an extent as to be out of danger of injury when conveying the machine from one place to another over roadways.

My invention consists in a lawn mower provided with forward supporting wheels and bearings, and combined with adjusting devices between the said wheels and their bearings and the main frame of the lawn mower, whereby the operator may readily adjust the elevation of the forward part of the machine and thereby the position of the cutters with respect to the ground, the said cutters being arranged intermediate of the rear supporting and driving wheels or drums and the front supporting or caster wheels.

My invention also consists in providing the said adjusting devices with means for locking the lawn mower frame at different elevations so that the cutters may be maintained at corresponding elevations to suit the requirements.

My invention also comprehends details of construction, which, together with the features above specified will be better understood by reference to the drawings, in which:—

Figure 1 is a side elevation of the lawn-mower embodying my invention; Fig. 2 is a side elevation of the same with part in section and showing the adjusting devices upon a larger scale; and Fig. 3 is a sectional plan view of the adjusting devices.

2 is the main frame of the lawn mower, and is supported upon the rear wheels or drums 3 which also act as driving wheels for operating the revolving cutter 4 in the well known manner.

5 is the stationary cutter bar whose position is comparatively close to the ground. A supporting roller 6 may be arranged between the cutter bar and the rear supporting wheels or drums 3 to prevent the cutter bar from striking the ground, even should the forward supporting wheels 10 not be sustaining the machine.

The machine may be operated in the ordinary manner while supported upon the roller 6 and wheels 3, but should the stationary cutter 5 be required to have a greater elevation from the ground to increase the length to be given to the cut grass, then my improved adjusting devices are to be employed for elevating the forward part of the main frame 2. These adjusting devices are arranged at each side of the machine, but in the illustration those at one side only are shown, as the use at both sides is merely a duplication.

I will now describe the construction of the adjusting devices in detail. The caster wheel 10 is journaled in the bearing 9 constituting a yoke, and provided with an upwardly extending stem which is adjustable about a vertical axis in the box 8, the yoke portion of the bearing 9 extending rearwardly at the bottom so that the wheel 10 acts as a caster wheel. The box 8 is adjustable vertically in the guideway 7 on the front end of the main frame 2, and is provided with a rack 11, with which pinion 12 meshes. This pinion 12 is secured upon the transverse shaft 13 journaled in the side frames 2 of the lawn mower. Secured to said shaft 13 is a bevel gear 14 by which it is rotated, and the said gear 14 is rotated by means of the bevel pinion 15 secured upon the lower end of the oblique shaft 16 which is directed upward toward the operator's seat 26, at the rear of the machine, and provided with a hand wheel 17 by which it may be rotated. The oblique shaft 16 is journaled in the fixed bearing 18 near the bottom and in a bracket 19 near the top. Also secured to the shaft 13 is a disk 20 having a series of notches 21, and two widely separated notches 22 and 23. The notches 21 are designed to vary the height of the cutter bar 5 above the ground for changing to a slight extent the length of the cut grass to be left standing; notch 23 is intended for use when insuring the cutter bar 5 being raised to a considerable elevation such as when topping the tall grass or other growth when the height is excessive, and which cutting may also be preliminary to the further cutting with a lower adjustment of the cutter bar; and the notch 22 is designed for use when the cutter bar is to be raised to the fullest extent, such as when the machine is being conveyed over roadways. Operating in connection with the notched disk 20 is a pawl 24 which has an engaging end that is caused to engage with the notches or detents of the disk 20 by means of the spring 25 pressing the said pawl normally into engagement with the said disk. The pawl is provided with a rearwardly extending treadle part to receive the pressure of the foot of the operator for disengaging the pawl from the notches of the disk 20 preliminary to making an adjustment.

The parts 13 to 25, above referred to, are preferably arranged close to the right hand side of the main frame so as to be within reach of the operator. The opposite side of the machine (not shown) may be provided with a caster wheel and adjusting devices similar to the parts 7 to 12 inclusive, above described, and the pinion 12 thereof would be operated by the same transverse shaft 13. By this means it is evident that an adjustment of the hand wheel 17 will simultaneously adjust both sides of the lawn mower. It is, of course, evident that if desired there may only be one caster wheel 10 employed in place of two as is customary, and this one may be located at any position desired, transversely considered with respect to the machine.

The operation of the device will now be understood. When the machine is adjusted, as indicated in Fig. 1, the cutter bar 5 will be closest to the ground possible. To adjust the cutter bar 5 to a slightly greater height from the ground, the pawl 24 is thrown out of engagement with the disk 20, and the hand wheel 17 is rotated sufficiently to bring the next one of the notches or detents 21 under the engaging end of the pawl; after which, the pawl is released, and the parts will be relocked. This action will have rotated the pinions 12 slightly, and caused them to travel upward upon the racks 11 to the desired extent, elevating shaft 13, and with it the forward part of the machine. As the cutter bar 5 is nearly half way between the shaft 13 and the axis of the rear wheels or drums 3, it is evident that the said cutter bar 5 will rise, approximately, one-half the vertical adjustment of the shaft 13 and forward part of the machine. Similarly, a further and slight adjustment may be given by engaging the pawl with the next notch 21. There may be more than two such notches for adjustment, if so desired. To raise the cutter bar sufficiently high to top the grass, the same operation is followed, but in this case the shaft 13 is rotated until the pawl engages the notch 23. In the same manner, when the cutter bar is to be fully raised, the shaft 13 may be rotated until the pawl engages the notch 22. If the adjusting devices are to be used during the grass cutting operation for simply elevating the cutters momentarily to pass an obstruction, then the pawl is maintained out of engaging position during such adjustment.

I have described my invention as applied to a horse power lawn mower, and moreover to one in which the cutters are in advance of the driving wheels or drums, but it is to be understood that I do not confine myself to any particular construction of a lawn mower, nor to the means employed to propel it, my invention comprehending the general construction of the means employed for adjusting one part of the main frame of the machine with respect to the other, whereby the cutter bar is adjusted relatively to the ground.

While I prefer the construction shown, as being an excellent embodiment of my invention in actual practice, I do not limit myself to the details as these may be modified without departing from the spirit of my invention.

Having now described my invention, what I claim as new and desire to secure by Letters Patent, is:—

1. The combination of a lawn mower having one end of its main frame supported upon driving wheels, with a supporting wheel at the other end of the main frame, a bearing in which the supporting wheel is journaled, a vertically adjustable box in which the bearing is journaled upon an upright axis and said box being provided with a rack and made adjustable in the main frame, a pinion journaled on the main frame engaging the rack of the box, a driver's seat, an oblique hand operated shaft extending toward the driver's seat, bevel gearing between the shaft and the pinion whereby the rotation of the shaft will raise and lower the main frame upon the box, and locking devices for locking the pinion in a plurality of positions against the rotation in its adjusted positions.

2. The combination of a lawn mower having one end of its main frame supported upon driving wheels, with a supporting wheel at the other end of the main frame, a bearing in which the supporting wheel is journaled, a vertically adjustable box in which the bearing is journaled upon an upright axis and said box being provided with a rack and made adjustable in the main frame, a pinion journaled on the main frame engaging the rack of the box, a driver's seat, an oblique hand operated shaft extending toward the driver's seat and journaled in a fixed oblique bearing, bevel gearing between the shaft and the pinion whereby the rotation of the shaft will raise and lower the main frame upon the box, and locking devices for locking the pinion against rotation in its adjusted positions consistsing of a disk secured so as to rotate with the pinion and having a plurality of notches or detents at intervals on its circumference, and a pawl hinged to the main frame and engaging the notches of the disk.

3. A lawn mower main frame having one end supported upon driving wheels, combined with a supporting wheel, a bearing for the supporting wheel having freedom of rotation about a vertical axis, a vertically adjustable box guided in the main frame and in which the bearing is journaled, a transverse shaft carried by the main frame, means secured to the transverse shaft connecting with the box for adjusting the end of the main frame vertically with respect to the box, rotary hand operated means having a hand wheel for rotating the transverse shaft, and locking devices for locking the shaft in a plurality of positions of adjustment consisting of a notched disk secured to the transverse shaft and a locking pawl having a treadle portion at a lower elevation than the hand wheel, whereby the end of the main frame may be adjusted and held at various elevations for changing the position of the cutters with respect to the ground and holding it in such positions.

In testimony of which invention, I have hereunto set my hand.

WM. P. M. BRAUN.

Witnesses:
R. M. HUNTER,
R. M. KELLY.